2,913,428

FLAME RESISTANT UNSATURATED POLYESTER COMPOSITION CONTAINING AN ORGANIC ANTIMONY COMPOUND

Blaine O. Schoepfle and Burton S. Marks, Niagara Falls, and Paul Robitschek, Wilson, N.Y., assignors to Hooker Chemical Corporation, Niagara Falls, N.Y., a corporation of New York No Drawing. Application October 4, 1957
Serial No. 688,144

11 Claims. (Cl. 260—28.5)

This invention relates to flame resistant polyester compositions and more particularly to such compositions containing organic flame-retarding agents soluble therein.

Synthetic resins such as polyester resins have found wide-spread use throughout industry, in ever increasing amounts. However, one of the most formidable deterrents to an even greater development has been their tendency to ignite and burn when placed in contact with a flame. The general trend of the research devoted to this problem has been toward the goal of producing a composition which, although it may still burn when held in a flame, will extinguish itself when the flame is removed.

Various methods have been used by experimenters in the field to diminish the flammability of the polyester resin. One method has been to introduce combined halogen into the polyester molecule itself. One example of this is the polyester formed by first producing the hexachlorocyclopentadiene adduct of maleic anhydride and esterifying it in the presence of an additional amount of maleic anhydride with a glycol such as ethylene glycol, after which the polyester may be cross-linked by any of the common cross-linking agents such as styrene, in the presence of a polymerization catalyst. This method has resulted in a material which has a very high degree of flame resistance. Other polyesters have been made utilizing tetrachlorophthalic anhydride as the acid component of the polyester molecule.

Another method for producing a flame resistant polyester composition has been to provide a physical mixture of a non-halogen containing polyester with a chlorinated paraffin wax. This has increased the flame resistance of the composition materially, although not to the degree enjoyed by the combined-chlorine-containing polyester resins, but has done this to the detriment of other desirable properties.

Some of these compositions, especially the combined-halogen-containing, such as chlorine-containing polyesters have been found suitable for a great many purposes where flame-resistance is desirable. However, for some uses, such as in the building trades, it has been found desirable to increase the flame-resistance of the polyester resin even to a higher degree than that already possessed by even the combined-halogen-containing polyesters. In order to accomplish this, as disclosed in copending application Serial No. 450,217, filed August 16, 1954, it was found effective to incorporate a small amount of antimony trioxide into the polyester resin. This succeeded in increasing flame-resistance over that of the chlorinated polyester or the chlorinated paraffin wax-containing polyester alone. However, it was found that the introduction of antimony trioxide into these polyesters rendered the final molded product made from same almost opaque, rendering them useless for applications where a transparent finished product or one having a high degree of light transmission was desired.

It is an object of the present invention to provide a polyester resin composition which has a very high degree of flame-resistance. It is a further object of this invention to provide a flame-retarding agent which will increase the flame-resistance of both halogen-containing and non-halogen containing polyester resins. It is a further object of this invention to provide a flame-retarding agent which will increase the flame-resistance of chlorinated paraffin wax containing polyester resins. It is a further object of this invention to provide such flame-retarding agents which do not appreciably diminish the light transmission of the cured polyester composition. It is a further object of this invention to provide such a flame-retarding agent which will not inhibit the final polymerization and cure of the polyester resin composition to the extent that it renders its use impractical. Further objects and advantages of this invention will appear more fully from the following description.

It has now been found that the flame-resistance of polyester resin compositions which contain copolymerizable unsaturation, said compositions also containing either combined chlorine within the polyester molecule or within the cross-linking agent therein or both or which contain an admixture of a combined-chlorine-containing additive may be rendered even more flame-resistant in the finally cured state, while at the same time retaining their light transmitting properties, by the incorporation into such compositions prior to the curing process, of an organic antimony compound which is soluble therein and which has the formula:

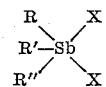

wherein R, R' and R" are aryl radicals, Sb is pentavalent antimony, and X is a monovalent radical selected from the group consisting of chloride, fluoride, hydroxide, an alcoholate, an organic acid radical, and mixtures thereof, and wherein 2X together is oxygen.

Among such organic acid radicals which are included in our invention are benzoates, acetate, caprylate, etc.

Among such alcoholate groups which are included in our invention are methoxy, ethoxy, propoxy, butoxy, benzoxy, etc.

It has further been found that the flame-resistance of even non-chlorine-containing polyesters may also be improved by the flame retarding agents of the present invention.

It has also been found that the incorporation of the soluble antimony compounds of the present invention does not appreciably diminish the light transmitting properties of the cured polyester resin. This is an important factor where the cured products are to be used in the building trades, where high light transmission is desired for many applications.

The halogen-containing polyester compositions, such as chlorine-containing, which may be utilized in the present invention fall generally within two different classes. In the first class the halogen is chemically combined in the polyester molecule itself, or in the cross-linking monomer or both. The second class contains those compositions where no chlorine is chemically combined in the polyester, but, chlorine is introduced into the pre-cured resin either by way of an additive such as chlorinated wax or one of the chlorine-containing additives of this invention, or both.

This classification does not preclude the possibility of utilizing an admixture of both the first and second class with the additives of this invention in order to obtain an improved fire-resistant resin.

Examples of the first class may be further subdivided into three different types of chlorine-containing polyester compositions. In the first type the halogen, e.g. chlorine is present in the form of a chlorinated adduct of the polycarboxylic acid, anhydride or alcohol. One example of this type is 1,4,5,6,7,7-hexachlorobicyclo-(2.2.1)-5-heptene-2,3-dicarboxylic anhydride, which is the adduct formed by reacting about equimolar amounts of hexachlorocyclopentadiene with maleic anhydride. This is then esterified with a glycol in the presence of additional maleic anhydride and finally cured in the presence of a polymerizable ethylenically unsaturated monomer such as styrene in the presence of a polymerization catalyst. Another example of the first type of the first class is the polyester resin produced from maleic anhydride, the adduct of hexachlorocyclopentadiene with butene diol, and cured in the presence of styrene.

The second type of the first class is the composition where the polybasic acid itself is chlorinated. An example of this is the polyester which comprises the reaction product of tetrachlorophthalic anhydride with a glycol in the presence of an additional unsaturated acid to provide double bonds for cross-linking, a polymerizable monomer such as styrene and a polymerization catalyst.

The third type of the first class comprises polyester compositions which contain a chlorinated cross-linking agent. Among such chlorinated cross-linking agents are the various chlorinated styrenes, e.g. mono, di and tri chlorostyrenes and certain adducts of hexahalocyclopentadiene.

The compositions of the second class which contain the chlorine combined in the additive or filler, can be illustrated by the composition comprising the reaction product of phthalic anhydride, maleic anhydride, a glycol, to which is added a chlorinated paraffin wax, styrene, and a polymerization catalyst.

The flame-retarding agents of the present invention are defined by the formula:

wherein R, R' and R" are aryl radicals, Sb is pentavalent antimony, and X is a monovalent radical selected from the group consisting of chloride, fluoride, hydroxide, an alcoholate, an organic acid radical, and mixtures thereof and wherein 2X together is oxygen. The aryl radicals may be either unsubstituted such as phenyl and naphthyl, or substituted radicals such as tolyl, ethyl phenyl, propyl phenyl, isopropyl phenyl, hydroxy phenyl, halo phenyl, etc. X is an anionic radical such as fluoride, chloride, acetate, benzoate, hydroxide, p-chlorobenzoate, methoxy, ethoxy, benzoxy, and mixtures thereof. R, R' and R" may be either different or the same radicals. Among the compounds which may be used as the flame-retarding agent are triphenyl stibine difluoride, triphenylstibine dichloride, triphenylstibine dibenzoate, tritolylstibine dichloride, triphenylstibine hydroxide cumylate, tritolylstibine difluoride, tritolylstibine diacetate, tritolylstibine dibenzoate, triphenylstibine dimethylate, ortho, para, and meta hydroxy isomers of either triphenylstibine dichloride, triphenylstibine difluoride, triphenylstibine diacetate, and triphenylstibine dibenzoate and mixtures thereof.

The antimony must be present in its pentavalent form since triaryl substituted trivalent antimony compounds have an inhibiting effect upon the free radical polymerization or cure of the polyester compositions of this invention. It was found for example that triphenyl stibine when included as a three percent (by weight) additive in the various polyesters of this invention would inhibit the polymerization to even a gelled state. Catalysis by one percent by weight of benzoyl peroxide (2 percent by weight of Luperco A.T.C. which is 50 percent benzoyl peroxide and 50 percent tricresyl phosphate), one percent by weight of commercial methylethylketone peroxide catalyst, one percent by weight of commercial tert-butyl hydroperoxide, etc., all proved unsuccessful in curing the resin. The polymerization inhibiting effect of this material is demonstrated by Example 19.

The flame-retarding agent of the present invention is used in amounts of at elast about 0.5 percent by weight of the total polyester composition. Three percent has a very appreciable effect in making the composition more flame-resistant. Five percent of the additive in most cases will impart excellent flame resistance. As much as ten percent or even more may be used where extremely high flame-resistance is desired. However, when a very large percentage of the flame retardant agent is used the product might become very expensive and may suffer deterioration in some of its physical properties; therefore, prudence in selecting the amount is recommended. The fire resistance imparting agents of the present invention may be incorporated in any method known to the art, and are generally incorporated by physical mixing with the liquid polyester composition. The composition may then be cured in the normal manner.

In the following examples which are given to further illustrate this invention, parts are given on a weight basis unless otherwise specified, and the examples are not intended to limit the invention except as defined in the appended claims.

Example 1 illustrates the preparation of a polyester resin wherein the polycarboxylic compound portion of same is the hexachlorocyclopentadiene adduct of maleic acid:

Example 1.—An unpolymerized liquid unsaturated polyester resin was prepared by esterifying about 159 parts of ethylene glycol with about 389 parts of 1,4,5,6,7,7 - hexachlorobicyclo - (2.2.1) - 5 - heptene - 2,3-dicarboxylic acid (which was prepared by the Diels-Alder reaction of hexachlorocyclopentadiene with maleic anhydride and then hydrolyzed), 152 parts of adipic acid and 61 parts of fumaric acid. About 40 parts of styrene and about 100 parts of the product produced by the esterification reaction were mixed together until complete solution was attained to give a clear, substantially colorless solution of liquid polyester resin having a viscosity of about 10 poises at 25 degrees centigrade on a Gardner bubble viscometer and having a chlorine content of about 22.5 percent by weight of the total.

Example 2.—In order to prepare triphenylstibine dichloride, triphenylstibine was first prepared according to the method described in G. S. Heirs' "Organic Synthesis," Col. Vol. I, John Wiley & Sons, New York, p. 550 (1941). The triphenylstibine was then dissolved in sufficient light petroleum to effect complete solution, at which time chlorine was continually introduced as long as a precipitate formed. The triphenylstibine dichloride so prepared was then recrystallized and dried.

Table I below indicates the results of flame retardance tests according to ASTM D–757–49 on samples cut from cylindrical castings made from a resin prepared in the manner of Example 1 into which the indicated amounts of triphenylstibine dichloride as prepared above in Example 2 had been added and mixed. In each case two percent (by weight) of Luperco ATC catalyst (a mixture of fifty percent benzoyl peroxide and fifty percent tricresyl phosphate) was incorporated into the mixture. The castings for tests were prepared by passing the liquid resin mix containing the flame-resistant agent into 8 mm. diameter glass tubes, after which the material was first gelled and cured at 50 degrees centigrade for 24 hours and then post-cured at 80 degrees centigrade for at least 15 hours.

TABLE I

*Flame retardance of castings (per ASTM D–757–49)*

| Example No. | Triphenyl- stibine Dichlo- ride, Parts per Hundred Resin | Barcol Hard- ness | Time to Ignite, Secs. | Flame- out Time, Secs. | Inches Burned Per Minute |
|---|---|---|---|---|---|
| 3 | 0 | 35 | 0 | 180 | 0.52 |
| 4 | 3 | 35 | 0 | 153 | 0.26 |
| 5 | 5 | 37 | 0 | 155 | 0.19 |

The following Examples 6 and 7 illustrate the preparation and use in polyester compositions of the triarylstibine dibenzoates as exemplified by triphenyl stibine dibenzoate.

*Example 6.*—A mixture of 10.6 grams (0.03 mole) of triphenylstibine, 7.3 grams (0.03) mole of benzoyl peroxide, and 200 cc. of normal hexane were heated for approximately one hour. The white shiny crystalline precipitate was filtered off to yield 13.6 grams (76%) of triphenylstilbine dibenzoate. The corrected melting point was 174–177 degrees centigrade. The literature reports a melting point of 170.5–173.5 degrees centigrade (F Challenger and V Wilson, Journal of Chemical Society, 209 (1927)). Recrystallization from benzene, petroleum ether gave a melting point of 172.5–173 degrees centigrade.

*Example 7.*—Into three hundred grams of the resin prepared in Example 1 was added nine grams or 3 percent by weight of triphenylstibine dibenzoate. The mixture was heated slightly and stirred on a steam bath in order to insure solution. After cooling, six grams or 2 percent by weight of Luperco ATC (50 percent benzoyl peroxide and 50 percent tricresyl phosphate) was added and stirred into the solution. The cure was carried out by first heating a bath maintained at 50 degrees centigrade for 24 hours, followed by heating in an oven maintained at 80 degrees centigrade for 24 hours,, to yield a clear transparent resin. This resin was self-extinguishing and had an ASTM D757–49 burning rate of 0.19 inch per minute as compared to 0.52 inch per minute in the control (Example 3).

Examples 8 and 9 following, illustrate the preparation and use in polyester compositions of the triarylstibine diacetates, as exemplified by triphenylstibine diacetate.

*Example 8.*—Triphenylstibine diacetate was prepared as follows according to the method of H Schmidt, Ann. 429, 142 (1922): Triphenylstibine dihydroxide is dissolved in hot acetic acid and allowed to stand over night. On cooling, triphenylstibine diacetate separated out and was filtered off. The purified material had a melting point of 215° C.

*Example 9.*—Nine grams or 3 percent by weight of triphenylstibine diacetate produced above were mixed together with 300 grams of the resin prepared in a manner after that described in Example 1. The mixture was heated and stirred on the steam bath to effect solution. After cooling, six grams or 2 percent by weight of a mixture of Luperco ATC (50 percent benzoyl peroxide and 50 percent tricresyl phosphate) were added and stirred into the solution. The resin was cured as in Example 7 above. A clear transparent flame-proof resin resulted. This resin was self-extinguishing and had an ASTM D757–49 burning rate of 0.19 inch per minute as compared to 0.52 inch per minute in the control.

Example 10 following illustrates the preparation of and use in polyester compositions of triphenylstibine dialcoholate as exemplified by triphenyl stibinedimethylate.

*Example 10.*—Into 40 ml. of anhydrous methanol was placed 2.7 g. (0.05 m.) of sodium methylate and 12.8 g. (0.025 m.) of triphenylstibine dibromide. The reaction mixture was kept at reflux for 2 hours after which time 5 ml. of dry toluene was added and the reaction mixture allowed to reflux for 15 hours more.

The mixture was cooled to yield a white precipitate. Addition of water to the filtrate yielded further product. Included in the product with triphenylstibine dimethylate was some of the half adduct triphenyl stibine methylate bromide. The product requires no further purification for use in the resin.

Nine grams or 3 percent by weight of product produced above were mixed together with 300 g. of the resin prepared in the manner after that described above. The mixture was heated and stirred on the steam bath to effect solution. After cooling, six grams or 2 percent by weight of a mixture of Luperco ATC (50 percent benzoyl peroxide and 50 percent tricresyl phosphate) were added and stirred into the solution. The resin was cured as in Example 7 above. A clear transparent flameproof resin resulted. This resin was self extinguishing and had an ASTM D757–49 burning rate of 0.20 inch per minute as compared to 0.52 inch per minute in the control.

Example 11 following illustrates the preparation of and use in polyester compositions of a derivative of triarylstibine as exemplified by triphenylstibine dihydroxide.

*Example 11.*—Into 100 ml. of cyclohexane was placed 10.6 g. (.03 m.) of triphenylstibine and 6.25 g. (0.03 m.) of 73% cumylhydroperoxide was added dropwise. There was an immediate exothermic reaction on addition and copious white precipitate was noted to form as the reaction progressed. The reaction was allowed to stir overnite. The product was filtered and washed with cyclohexane and dissolved in benzene. Stripping off of the solvent yielded triphenylstibine dihydroxide, a white precipitate, M.P. 215° C. corrected.

Nine grams or 3 percent by weight of product produced above were mixed together with 300 gms. of the resin prepared in a manner after that described above in Example 1. The mixture was heated and stirred on the steam bath to effect solution. After cooling, six grams or 2 percent by weight of a mixture of Luperco ATC (50 percent benzoyl peroxide and 50 percent tricresyl phosphate) were added and stirred into the solution. The resin was cured as in Example 7 above. A clear, transparent, flame-proof resin resulted. The resin was self-extinguishing and had an ASTM D757–49 burning rate of 0.19 inch per minute as compared to 0.52 inch per minute in the control.

Although the foregoing examples, all of which are typical of the first type of the first class of compositions previously described have emphasized the product resulting from the use of the adduct of hexachlorocyclopentadiene with maleic anhydride, other adducts of hexahalocyclopentadiene may be used, among which are the following: 1,4,5,6,7,7-hexachloro-2-methylbicyclo-(2.2.1)-5-heptene-2,3-dicarboxylic anhydride, said compound and its method of preparation being disclosed and claimed in copending application Ser. No. 308,924, filed September 10, 1952, now U.S. Patent No. 2,779,769, involving the reaction of hexachlorocyclopentadiene with citraconic anhydride; the mono-methyl ester of 1,4,5,6, 7,7 - hexachlorobicyclo-(2.2.1)-5-heptene-2,3-dicarboxylic acid, said compound being prepared by the method involving the reaction of hexachlorocyclopentadiene with maleic anhydride followed by esterification of the adduct so produced with the amount of methanol required to produce the mono-methyl ester; 3-(1,4,5,6,7,7-hexachlorobicyclo-(2.2.1)-5 heptene-2yl methoxy-1,2-propanediol, said compound and its method of preparation being described in copending application Ser. No. 309,922, filed September 10, 1952, involving the reaction fo hexachlorocyclopentadiene with alpha allyl glycerol ether; 1,4,5,7 - tetrachloro-6,7-difluorobicyclo-(2.2.1)-5-heptene-2,3-dicarboxylic acid, said compound and its method of preparation being disclosed and claimed in copending application Ser. No. 308,934, filed September 10, 1952, now abandoned, involving the reaction of 1,2,4,5-tetrachloro-1,3-difluorocyclopentadiene with maleic anhydride; 1,4,5,6,7,7 - hexachlorobicyclo-(2.2.1)-5-heptene-2-acetic-2-carboxylic anhydride, said compound and its method of preparation being disclosed and claimed in copending application Ser. No. 308,923, filed September 10, 1952, now U.S. Patent No. 2,752,361, involving the reaction of hexachlorocyclopentadiene with itaconic anhydride; and 1,4,5,6,7,7-hexachlorobicyclo-(2.2.1)-5-heptene-2,3-dicarbonyl chloride; said compound and its method of preparation being disclosed and claimed in copending application Ser. No. 450,216, filed August 16, 1954, now U.S. Patent No. 2,812,347, involving the reaction of hexachlorocyclopentadiene with fumaryl chloride.

Various other adducts of hexahalocyclopentadiene may also be employed particularly in the cross linking agent, such as: diallyl-1,4,5,6,7,7-hexachlorobicyclo-(2.2.1) - 5-heptene-2,3-dicarboxylate: diallyl-1,4,5,6,7,7-hexachloro - 2 - methylbicyclo-(2.2.1)-5-heptene-2,3-dicarboxylate; diallyl - 1,2,4,5,6,7,7 - heptachlorobicyclo-(2.2.1)-5-heptene-2,3-dicarboxylate; and triallyl-1,4,5,6,7,7 - hexachlorobicyclo-(2.2.1)-5-heptene-2-acetate-2,3-dicarboxylate. These compounds can be prepared by reacting hexachlorocyclopentadiene with the indicated dicarboxylic acid and esterifying the resultant product with an unsaturated alcohol such as allyl alcohol.

Still other adducts of hexahalocyclopentadiene may be employed, for instance, the adducts formed with: unsaturated polycarboxylic acids such as, fumaric, itaconic, acetylene dicarboxylic and esters and halogen substituted derivatives thereof, etc.; unsaturated polyhydric alcohols such as, butene-diol, etc.; also unsaturated hydroxy ethers such as, allyl or vinyl glycerol ethers, allyl or vinyl pentaerythritol ethers, etc.; and still other chemical compounds comprising an ethylenic or an acetylenic linkage which are not rendered unreactive in the polyester chain by their chemical combination into the polyester chain by way of other functional groups.

The following Examples 12 and 13 typify the second type of the first class of polyester compositions previously described and illustrate the benefit of using an additive of the present invention with a polyester resin composition where the acid component of the ester is directly chlorinated. Each of the resins of these examples were made by mixing 100 parts of a tetrachlorophthalic anhydride based styrenated polyester resin with two percent by weight of a mixture of 50 percent benzoyl peroxide and 50 percent tricresylphosphate. The resin used was a clear, light-amber-colored, thick liquid having a slight odor and having a viscosity at 25 degrees centigrade of 3700–4400 centipoises; it has a specific gravity of 1.270–1.280 at 25 degrees centigrade and its refractive index at this temperature is 1.5566; it has a styrene content of 28.0 percent and an acid number of 17–19. Example 12 is the control and Example 13 uses the designated antimony additive. Curing was obtained by first heating in a bath maintained at 50 degrees centigrade for 24 hours followed by heating in an oven maintained at approximately 80–90 degrees centigrade for 24 hours. The catalyst and curing conditions set forth above were used throughout in preparing the finally cured resins of this invention.

| Ex. No. | Resin, 100 parts | Sb additive, 3 parts | ASTM D757-49 Burning Rate, in. per min. |
|---|---|---|---|
| 12 | Tetrachlorophthalic anhydride based resin. | None | 0.32 |
| 13 | ------do------ | Triphenylstibine Dichloride. | 0.25 |

The following Examples 14 and 15 typifying the third type of the first class of compositions previously described, illustrate the advantage to be obtained by adding and curing in the manner previously described, a flame retarding agent of the present invention with polyester resins which do not themselves contain combined chlorine, but in which however the cross-linking agent is chlorinated. The polyester resin used in both of these examples was the same and was a phthalic acid, maleic anhydride, ethylene glycol, based resin with dichlorostyrene used as the cross-linking agent. The data shows the properties obtained.

| Ex. No. | Flame Retarding Agent | Additive in parts per hundred of resin | ASTM D757-49 Burning Rates, in. per min. |
|---|---|---|---|
| 14 | None | | 0.59 |
| 15 | Triphenylstibine dibenzoate | 3 | 0.41 |

The following Examples 16, 17 and 18, typifying the second class of compositions previously described, illustrate the advantages to be obtained by adding the flame-retarding agents of the present invention to polyester resins which themselves do not contain combined chlorine. The cross-linking agent used is also unchlorinated. The polyester resin was a standard phthalic acid based polyester resin, having a light straw color, a specific gravity and viscosity at 77 degrees Fahrenheit of 1.13 and 675 centipoises Brookfield respectively and a styrene content of 34 percent. The data show the properties obtained.

| Ex. No. | Resin, 100 parts | Sb Additive, 5 parts | ASTM D635-44,[1] inches per min. |
|---|---|---|---|
| 16 | Phthalic acid based resin | None | 0.96 |
| 17 | ------do------ | Triphenyl stibine dichloride. | 0.84 |
| 18 | Phthalic acid based resin +5% Chlorinated Paraffin (70% Chlorine). | ---do--- | 0.64 |

[1] The following modifications of ASTM procedure D635-44 were used for the evaluations:
(1) No wire gauze was used under the sample.
(2) The time of burning was taken from the end of the sample to a point three inches from the same end.
(3) Samples 0.1 inch thick were used.

The above table shows that the addition of a small amount of triphenylstibine dichloride to a non-chlorine-containing polyester will itself considerably improve the flame-resisting properties. However, when the triphenylstibine dichloride is used in conjunction with a fire retardant additive such as chlorinated wax, the flame-resisting properties are improved to an even greater extent.

All the resins in the above examples were transparent, as well as flame-resistant, in contrast to those compositions produced by using antimony trioxide which are opaque.

The following example demonstrates as previously discussed that the presence of triphenyl stibine inhibits the polymerization of the polyester resin.

*Example 19.*—In a large casting test tube were placed the following ingredients: 100 grams polyester resin of Example 1, 3 grams triphenyl stibine, and 2 grams of Luperco ATC (50 percent benzoyl peroxide and 50 percent tricresyl phosphate). The test tube was placed in a 50° C. bath; however after 48 hours no gelation could be noted. Also raising the temperature to 80° C. and maintaining it for 24 hours did not cause gelation of the resin.

The polymerizable unsaturation of the polyesters of this invention may be obtained by introducing into the polyester chain a reactive unsaturated chemical ingredient which is capable of rendering the polyester copolymerizable even after it is in chemical combination in the polyester molecule. A particularly suitable material for this use is maleic anhydride; however any unsaturated polycarboxylic compound, such as substituted or unsubstituted acids, anhydrides and acide halides, or polyhydric alcohols, or, esters thereof, containing a plurality of esterifiable groups, and capable of esterification without losing its ability to copolymerize with olefinic cross-linking agents may be employed.

Another method of providing for copolymerizable unsaturation in the polyester chain which may be employed involves: effecting the diene synthesis of hexachlorocyclopentadiene with a polybasic alcohol or acid or ester, or equivalents thereof, which contains at least two olefinic linkages, one of which is reactive in the diene synthesis, while the others which are unreacted, are capable of being copolymerizable in the cross-linking reaction. Among the materials which are useful for this purpose are acetylenic compounds and di-olefinic and poly-olefinic compounds.

Having thus described our invention, what we claim and desire to secure by Letters Patent is:

1. A polymerizable mixture comprising (A) a polymerizable unsaturated polyester of ingredients comprising (1) a polycarboxylic compound and (2) a polyhydric alcohol; (B) an ethylenically unsaturated monomer copolymerizable with (A), and (C) a flame retardant agent having the formula:

wherein R, R' and R" are aryl radicals, Sb is pentavalent antimony, X is a monovalent radical selected from the group consisting of chloride, fluoride, hydroxide, alkoxy, benzoxy, benzoate, aliphatic carboxylate, and mixtures thereof, and wherein said flame retarding agent is soluble in the mixture of (A) and (B) and is present in an amount at least about 0.5 percent by weight of A and B.

2. A mixture according to claim 1, wherein a portion of said polycarboxylic compound (1) comprises the adduct of hexahalocyclopentadiene and a polycarboxylic compound containing aliphatic carbon to carbon unsaturation, wherein the halogen is selected from the group consisting of chlorine, bromine, fluorine and mixtures thereof.

3. A mixture according to claim 1, wherein a portion of said polyhydric alcohol (2) comprises the adduct of hexahalocyclopentadiene and a polyhydric alcohol containing aliphatic carbon to carbon unsaturation, wherein the halogen is selected from the group consisting of chlorine, bromine, fluorine and mixtures thereof.

4. A mixture according to claim 2 wherein the adduct is 1,4,5,6,7,7-hexachlorobicyclo - (2.2.1) - 5-heptene-2,3-dicarboxylic acid.

5. A mixture according to claim 2 wherein the adduct is 1,4,5,6,7,7-hexachlorobicyclo(2.2.1)-5-heptene-2,3-dicarboxylic anhydride.

6. A mixture according to claim 1 wherein a portion of said polycarboxylic compound (1) comprises tetrachlorophthalic anhydride.

7. A mixture according to claim 1 wherein said copolymerizable ethylenically unsaturated monomer is selected from the group consisting of styrene and dichlorostyrene.

8. A mixture according to claim 1 having a minor proportion of a chlorinated paraffin wax added thereto.

9. A mixture according to claim 1 when polymerized to an infusible, insoluble state.

10. A mixture according to claim 1 wherein the substituent X in the flame retardant agent (C) is a chlorine radical.

11. A mixture according to claim 1 wherein the substituents R, R' and R" in the flame retardant agent (C) are the same radical.

References Cited in the file of this patent

UNITED STATES PATENTS

| | | |
|---|---|---|
| 2,299,612 | Clayton et al. | Oct. 20, 1942 |
| 2,413,163 | Bacon | Dec. 4, 1946 |
| 2,420,644 | Athy et al. | May 20, 1947 |
| 2,566,208 | Jenkins | Aug. 28, 1951 |
| 2,640,000 | Seyb et al. | May 26, 1953 |

OTHER REFERENCES

Ind. and Eng. Chem., vol. 46, No. 8, August 1954, pages 1628–1632.

UNITED STATES PATENT OFFICE
CERTIFICATE OF CORRECTION

Patent No. 2,913,428                                November 17, 1959

Blaine O. Schoepfle et al.

It is hereby certified that error appears in the printed specification of the above numbered patent requiring correction and that the said Letters Patent should read as corrected below.

Column 4, line 12, for "elast" read -- least --; column 6, line 69, for "Ser. No. 309,922" read -- Ser. No. 308,922 --; line 70, for "reaction fo" read -- reaction of --; column 9, line 2, for "acide" read -- acid --.

Signed and sealed this 26th day of July 1960.

(SEAL)

Attest:
KARL H. AXLINE
Attesting Officer

ROBERT C. WATSON
Commissioner of Patents